United States Patent
Xu et al.

(10) Patent No.: US 11,680,858 B2
(45) Date of Patent: Jun. 20, 2023

(54) DEVICE AND METHOD FOR ULTRASONIC DETECTING OF ROTATING MEMBER BASED ON MAGNETIC FLUID COUPLING

(71) Applicant: BEIJING INSTITUTE OF TECHNOLOGY, Beijing (CN)

(72) Inventors: Chunguang Xu, Beijing (CN); Shuangyi Li, Beijing (CN); Yuren Lu, Beijing (CN); Peng Yin, Beijing (CN); Dezhi Li, Beijing (CN); Wenyuan Song, Beijing (CN)

(73) Assignee: BEJING INSTITUTE OF TECHNOLOGY

( * ) Notice: Subject to any disclaimer, the term of this patent is extended or adjusted under 35 U.S.C. 154(b) by 88 days.

(21) Appl. No.: 17/377,200

(22) Filed: Jul. 15, 2021

(65) Prior Publication Data

US 2022/0026293 A1    Jan. 27, 2022

(30) Foreign Application Priority Data

Jul. 23, 2020   (CN) .......................... 202010718718.X

(51) Int. Cl.
  *G01L 1/25*   (2006.01)
  *G01N 29/07*  (2006.01)
  (Continued)

(52) U.S. Cl.
  CPC ............ *G01L 1/255* (2013.01); *G01N 29/043* (2013.01); *G01N 29/07* (2013.01); *G01N 29/27* (2013.01);
  (Continued)

(58) Field of Classification Search
  CPC ...... G01N 29/07; G01N 29/28; G01N 29/043; G01N 29/27
  See application file for complete search history.

(56) References Cited

U.S. PATENT DOCUMENTS

2011/0303013 A1* 12/2011 Kass ................... G01D 11/245
                                                          73/632
2021/0389195 A1* 12/2021 Xu ........................ G01L 1/255
2022/0026292 A1*  1/2022 Xu ........................ G01L 1/255

FOREIGN PATENT DOCUMENTS

CN         2842393 Y    11/2006
CN      102537367 A     7/2012
(Continued)

OTHER PUBLICATIONS

English Translation of SU1281991.*
English Translation of CN102537367.*

*Primary Examiner* — Helen C Kwok
(74) *Attorney, Agent, or Firm* — Shumaker, Loop & Kendrick, LLP; John A. Miller

(57) ABSTRACT

A device and a method for ultrasonic detecting a rotating member based on magnetic fluid coupling, wherein the device comprises an ultrasonic probe, magnetic field protection rings, magnetic fluid and a magnetic fluid protection cover. The ultrasonic probe is arranged above the rotating member that is horizontally placed. Front ends of a transmitting ultrasonic transducer and a receiving ultrasonic transducer of the ultrasonic probe are provided with the magnetic field protection rings for generating magnetic fields in the magnetic field protection rings. The protective cover is sleeved on a circumferential outer side of the rotating member where a detected position is located, and the front ends of the ultrasonic probe are arranged to penetrate through the magnetic fluid protective cover. A cavity formed between the magnetic fluid protective cover and the rotating member is filled with the magnetic fluid and the magnetic fluid is a liquid mixture solution.

7 Claims, 2 Drawing Sheets

(51) Int. Cl.
  *G01N 29/27* (2006.01)
  *G01N 29/04* (2006.01)
  *G01N 29/28* (2006.01)

(52) U.S. Cl.
  CPC ....... *G01N 29/28* (2013.01); *G01N 2291/101* (2013.01)

(56) References Cited

FOREIGN PATENT DOCUMENTS

| | | | |
|---|---|---|---|
| CN | 105910742 A | | 8/2016 |
| CN | 206876640 U | | 1/2018 |
| CN | 207741879 U | | 8/2018 |
| JP | 56-132559 | * | 10/1981 |
| JP | 59-119260 | * | 7/1984 |
| JP | 60-057248 | * | 4/1985 |
| JP | 60-082960 | * | 5/1985 |
| JP | S60105960 A | | 6/1985 |
| SU | 1281991 A1 | | 1/1987 |

* cited by examiner

DEVICE AND METHOD FOR ULTRASONIC DETECTING OF ROTATING MEMBER BASED ON MAGNETIC FLUID COUPLING

CROSS-REFERENCE TO RELATED APPLICATIONS

This application claims priority to China Patent Application Serial No. 202010718718.X filed Jul. 23, 2020, the entire disclosure of which is herein incorporated by reference.

BACKGROUND

Field

The disclosure relates generally to the field of mechanical service stress detection, and in particular to a device and a method for ultrasonic detecting a rotating member based on magnetic fluid coupling.

Discussion of the Related Art

Ultrasonic detection is a common nondestructive detection method, which has the advantages of wide application range, high sensitivity and high penetrability. The ultrasonic detection can be classified into a contact method and a liquid immersion method according to the coupling manner. In the liquid immersion method, a detection probe is placed in a liquid couplant and is not in direct contact with a member under detection, by which stable transmission and reception of ultrasonic waves can therefore be ensured, the influence of the roughness of a detected surface on the detection result can be reduced as much as possible, and the abrasion of the probe is reduced for the reason that the probe is not in direct contact with the detected surface. In the process of using the liquid immersion method, water, glycerin and the like are common couplants. If the member under detection is of a curved surface, the couplant may be lost during detection, and the surface of the member under detection may be corroded after long-term use.

Magnetic fluid is a solution which is not easy to generate precipitate and can stably exist for a long time. The magnetic fluid has the characteristics of liquid and magnetism, which can be used as a couplant for ultrasonic nondestructive detecting. The magnetic fluid contains fine particles, has higher density than couplants such as water and the like, can better fit the surface of the member under detection, and can also ensure that the thickness of a coupling layer is constant by matching with a detecting device.

The member under detection is usually in a static state, but in practical application, for example for a machine tool main shaft, a flywheel, a turntable, a high-speed rail wheel and the like, only the service stress state in a rotating state can reflect the safety, the stability and the like of the member, which has important engineering significance. Therefore, there is a need to study the service stress state of the rotating motion member.

Patent document CN206876640U provides spatially scanning magnetic fluid sealed partial immersion ultrasonic detector, which is composed of a spatial scanning unit and a local water immersion type ultrasonic flaw detection unit. A magnetic induction coil is electrified to form magnetic force to fix a magnetic fluid, so that the magnetic fluid is completely in contact with the surface of a member under detection and a sealing ring is formed. Water is then injected into a cavity sealed by the magnetic fluid to realize water immersion detection. In this patent, the magnetic fluid is mainly used to seal the cavity, which reduces the loss of water as a couplant in the detection process, and the magnetic fluid is not used as a couplant at this time. Therefore, according to the above research on the couplant, it is necessary to design a corresponding detection device and method for the rotating member for the case of magnetic fluid as the couplant.

SUMMARY

In view of the above problems, the present disclosure provides a device for ultrasonic detecting a rotating member based on magnetic fluid coupling, comprising an ultrasonic probe, magnetic field protection rings, magnetic fluid and a magnetic fluid protection cover;

the ultrasonic probe is arranged above a rotating member under detection which is horizontally placed, and front ends of a transmitting ultrasonic transducer and a receiving ultrasonic transducer of the ultrasonic probe are provided with the magnetic field protection rings for generating magnetic fields in the magnetic field protection rings; and the magnetic fluid protective cover is sleeved on a circumferential outer side of the rotating member under detection where a detected position is located, and the front ends of the ultrasonic probe are arranged to penetrate through the magnetic fluid protective cover; a cavity formed between the magnetic fluid protective cover and the rotating member under detection is filled with the magnetic fluid; and the magnetic fluid is a liquid mixture solution, which at least includes oily or aqueous liquid and suspended ferromagnetic particles.

From the above, the magnetic field protection rings form semi-closed magnetic fields therein, so that the magnetic fluid is attracted and attached to the surfaces of the ultrasonic transducers of the ultrasonic probe and does not fall off therefrom, and achieves tight coupling with the surfaces of the ultrasonic transducers of the ultrasonic probe, thereby reducing the propagation loss of the ultrasonic waves. Meanwhile, the magnetic fluid has liquid characteristics, which can better adhere to the surface of the member under detection. Therefore, magnetic fluid coupling is formed between the probe and the rotating member under detection.

From the above, when the member under detection rotates, the magnetic fluid protective cover prevents the magnetic fluid on the surface of the rotating member under detection from centrifugal leakage, which maintains the thickness and the concentration of the magnetic fluid and ensures the accuracy and the stability of the detecting of the rotating member.

From the above, the transmitting ultrasonic transducer of the ultrasonic probe transmits ultrasonic waves which are transmitted to a detected position of the rotating member under detection and enter the interior of the rotating member under detection by utilizing the acoustic permeability of the magnetic fluid. Ultrasonic echoes are refracted critically through the inside of the rotating member under detection, wherein waveform parameters of the ultrasonic echoes are related to the service stress inside the rotating member under detection. The ultrasonic echoes are detected by the receiving ultrasonic transducer of the ultrasonic probe to calculate the internal service stress of the rotating member under detection, thereby realizing the ultrasonic detecting of the internal service stress of the rotating member under detection.

Wherein, the magnetic field protection rings are made of permanent magnet materials.

From the above, the permanent magnet materials can generate a stable semi-closed magnetic field, so that the magnetic fluid is attracted and attached to the surfaces of the ultrasonic transducers of the ultrasonic probe and does not fall off therefrom, and achieves tight coupling with the surfaces of the ultrasonic transducers of the ultrasonic probe, thereby reducing the propagation loss of the ultrasonic waves.

Wherein, the magnetic field protection rings have a distance greater than 0.05 mm from the surface of the rotating member under detection.

From the above, the magnetic field protection rings having a distance greater than 0.05 mm from the surface of the rotating member under detection protects the magnetic field protection rings from touching the rotating member under detection.

Wherein, the two ultrasonic transducers of the ultrasonic probe are each provided with an acoustic impedance matching layer that matches acoustic impedance of the magnetic fluid.

From the above, the acoustic impedance matching layers reduce the propagation loss of the ultrasonic waves between the probe and the magnetic fluid.

Wherein, the direction of the arranged ultrasonic probe is a circumferential direction or an axial direction of the rotating member under detection, wherein the direction of the ultrasonic probe is the direction of a connecting line from a center position of the transmitting ultrasonic transducer to a center position of the receiving ultrasonic transducer.

From the above, if the axial service stress of the detected position is detected, the direction of the ultrasonic probe is the axial direction of the rotating member under detection, and if the circumferential service stress of the detected position is detected, the direction of the ultrasonic probe is the circumferential direction of the rotating member under detection.

Wherein, parts of two ends of the magnetic fluid protection cover that are in contact with a circumferential surface of the rotating member under detection are sealed by a soft material.

From the above, the soft material seals a gap between the magnetic fluid protection cover and the circumferential surface of the rotating member under detection, so that the magnetic fluid is further protected from leakage, and meanwhile, the soft characteristic of the soft material protects the magnetic fluid protection cover from damaging the surface of the rotating member under detection.

In conclusion, the device according to the present disclosure couples the ultrasonic probe and the surface of the rotating member under detection through the magnetic fluid under the action of the magnetic fields of the permanent magnet protection rings, and the density of the magnetic fluid is kept unchanged under the protection of the magnetic fluid protective cover when the rotating member under detection rotates, thereby realizing stable and accurate ultrasonic nondestructive detecting of the internal service stress of the rotating member under detection.

The present disclosure further provides a method for ultrasonic detecting a rotating member based on magnetic fluid coupling, which comprises the steps of:

installing the device for ultrasonic detecting the rotating member based on magnetic fluid coupling on a circumferential outer side of a member under detection where a detected position is located;

rotating the member under detection; and transmitting ultrasonic waves by the transmitting ultrasonic transducer of the ultrasonic probe in the device, and detecting, by the receiving ultrasonic transducer of the ultrasonic probe, ultrasonic echoes refracted critically by the rotating member under detection so as to calculate the internal service stress of the rotating member under detection.

The calculation of the internal service stress of the rotating member under detection based on the ultrasonic echoes is carried out by a peripheral device, which does not belong to the content of the disclosure and is not described herein.

EXPLANATION OF THE REFERENCE SIGNS 10-ultrasonic probe, 11-magnetic field protection ring, 20-magnetic fluid, 30-magnetic fluid protection cover, and 40-rotating member under detection.

DETAILED DESCRIPTION OF THE EMBODIMENTS

A main object of the present disclosure is to provide a device and a method for ultrasonic detecting a rotating member based on magnetic fluid coupling.

The device and the method according to the present disclosure will now be described in detail with reference to embodiments shown in the accompanying drawings.

Figure 1:
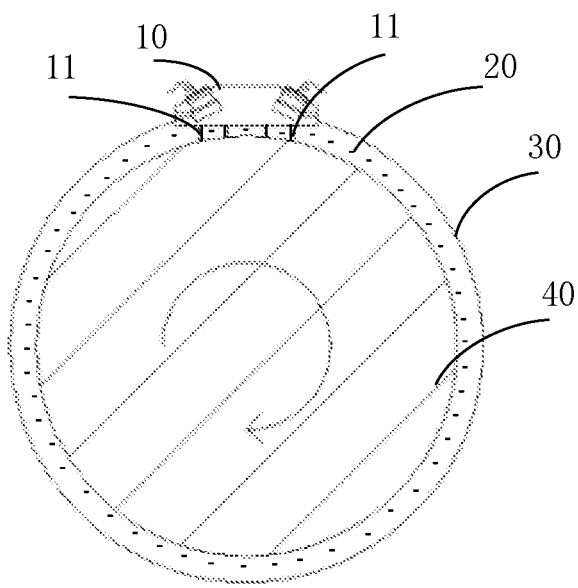
FIG. 1 is a schematic diagram of a device for ultrasonic detecting a rotating member based on magnetic fluid coupling according to an embodiment of the present disclosure, which is used for detecting circumferential service stress of the rotating member.

As shown in FIG. 1, the present disclosure provides a device for ultrasonic detecting a rotating member based on magnetic fluid coupling, which includes an ultrasonic probe 10, magnetic field protection rings 11, magnetic fluid 20, and a magnetic fluid protection cover 30.

The ultrasonic probe 10 is arranged above a rotating member 40 under detection that is horizontally placed. Front ends of a transmitting ultrasonic transducer and a receiving ultrasonic transducer of the ultrasonic probe 10 are provided with the magnetic field protection rings 11 for respectively generating magnetic fields therein. A circumferential outer side of the rotating member 40 under detection is equipped with the magnetic fluid protection cover 30 for sealing. The magnetic fluid 20 is filled in the magnetic fluid protection cover 30 between the respective magnetic field protection rings 11 and the rotating member 40 under detection.

Wherein, acoustic impedance matching layers of the two ultrasonic transducers of the ultrasonic probe 10 match acoustic impedance of the magnetic fluid 20. A direction of the ultrasonic probe 10 is arranged as a circumferential direction or an axial direction of the rotating member 40 under detection, and the direction of the ultrasonic probe is a direction of a connection line from a center position of the transmitting ultrasonic transducer to a center position of the receiving ultrasonic transducer.

Wherein, the magnetic field protection rings 11 are made of permanent magnet materials, and have a distance greater than 0.05 mm from the surface of the rotating member 40 under detection.

Wherein, the magnetic fluid 20 is a liquid mixture solution, which at least includes oily or aqueous liquid and suspended ferromagnetic particles, and further includes thickeners, preservatives, or antioxidants.

Wherein, parts of two ends of the magnetic fluid protection cover 30 that are in contact with the circumferential surface of the rotating member 40 under detection are sealed by a soft material that may be felt or rubber.

A working principle of the device for ultrasonic detecting a rotating member based on magnetic fluid coupling is described below.

Wherein, the transmitting ultrasonic transducer of the ultrasonic probe 10 transmits ultrasonic waves which are transmitted to a detected position of the rotating member 40 under detection and enter the interior of the rotating member 40 under detection by utilizing the acoustic permeability of the magnetic fluid 20. Ultrasonic echoes are refracted critically through the inside of the rotating member 40 under detection, wherein waveform parameters of the ultrasonic echoes are related to the service stress inside the rotating member 40 under detection. The ultrasonic echoes are detected by the receiving ultrasonic transducer of the ultrasonic probe 10 to calculate the internal service stress of the rotating member 40 under detection, thereby realizing the ultrasonic detecting of the internal service stress of the rotating member 40 under detection.

Wherein, the magnetic fluid 20 is filled between the magnetic field protection ring 11 at the front end of the transmitting ultrasonic transducer of the ultrasonic probe 10 and the rotating member 40 under detection and between the magnetic field protection ring 11 at the front end of the receiving ultrasonic transducer of the ultrasonic probe 10 and the rotation member 40 under detection, thereby realizing coupling of the ultrasonic probe 10 and the rotating member 40 under detection.

Wherein, when the rotating member 40 under detection rotates, the magnetic fluid 20 protected by the magnetic fluid protective cover 30 and the soft material do not leak due to the centrifugal force, thereby realizing that the magnetic fluid 20 is not lost and its density distribution is kept stable, and improving the stability of detecting of the rotating member.

Wherein, the direction of the ultrasonic probe 10 is the direction of a connection line from the transmitting ultrasonic transducer to the receiving ultrasonic transducer. If the circumferential service stress at the detected position of the rotating member 40 under detection is detected, the direction of the ultrasonic probe 10 is the circumferential direction of the rotating member 40 under detection. If the axial service stress at the detected position of the rotating member 40 under detection is detected, the direction of the ultrasonic probe 10 is the axial direction of the rotating member 40 under detection. The direction of the ultrasonic probe 10 may be controlled to detect stresses in different directions.

From the above, the device realizes ultrasonic detecting the rotating member based on magnetic fluid coupling.

The advantages of the device for ultrasonic detecting the rotating member based on magnetic fluid coupling are described below.

Wherein, in this embodiment, the magnetic field protection rings 11 are all made of permanent magnets, and a semi-closed magnetic field is formed in each of the magnetic field protection rings 11, so that the magnetic fluid 20 in the magnetic field protection rings 11 is attracted and attached to the surfaces of the ultrasonic transducers of the ultrasonic probe 10, thereby reducing the transmission loss of the ultrasonic waves at the interface between the ultrasonic probe 10 and the magnetic fluid 20, and improving the accuracy of the detection.

Wherein, the distance between each of the magnetic field protection rings 11 and the surface of the rotating member 40 under detection is larger than 0.05 mm, thereby protecting the magnetic field protection rings 11 from touching the surface of the rotating member 40 under detection, and realizing nondestructive detection.

Wherein, the acoustic impedance matching layers of the two ultrasonic transducers of the ultrasonic probe 10 match the acoustic impedance of the magnetic fluid 20, thereby reducing the propagation loss of the ultrasonic waves between the probe and the magnetic fluid 20, and improving the accuracy of the detection.

Wherein, the magnetic fluid 20 further contains thickeners, which improves the density of the magnetic fluid 20, reduces the loss of ultrasonic transmission, and improves the accuracy of the detection.

Wherein, the magnetic fluid 20 further contains antioxidants or preservatives, which prolongs the service life of the magnetic fluid.

In conclusion, the device according to the present disclosure couples the ultrasonic probe 10 and the surface of the rotating member 40 under detection through the magnetic fluid 20; the magnetic fluid 20 is in close contact with the front ends of the ultrasonic transducers of the ultrasonic probe 10 under the action of the magnetic fields of the permanent magnet protection rings 11, which reduces the transmission loss of the ultrasonic waves; when the rotating member 40 under detection rotates, the density of the magnetic fluid 20 is kept unchanged under the protection of the magnetic fluid protective cover 30, and the stability of propagating of the ultrasonic waves in the magnetic fluid 20 is kept, thereby realizing stable and accurate ultrasonic nondestructive detecting of the internal service stress of the rotating member 40 under detection.

Figure 3:
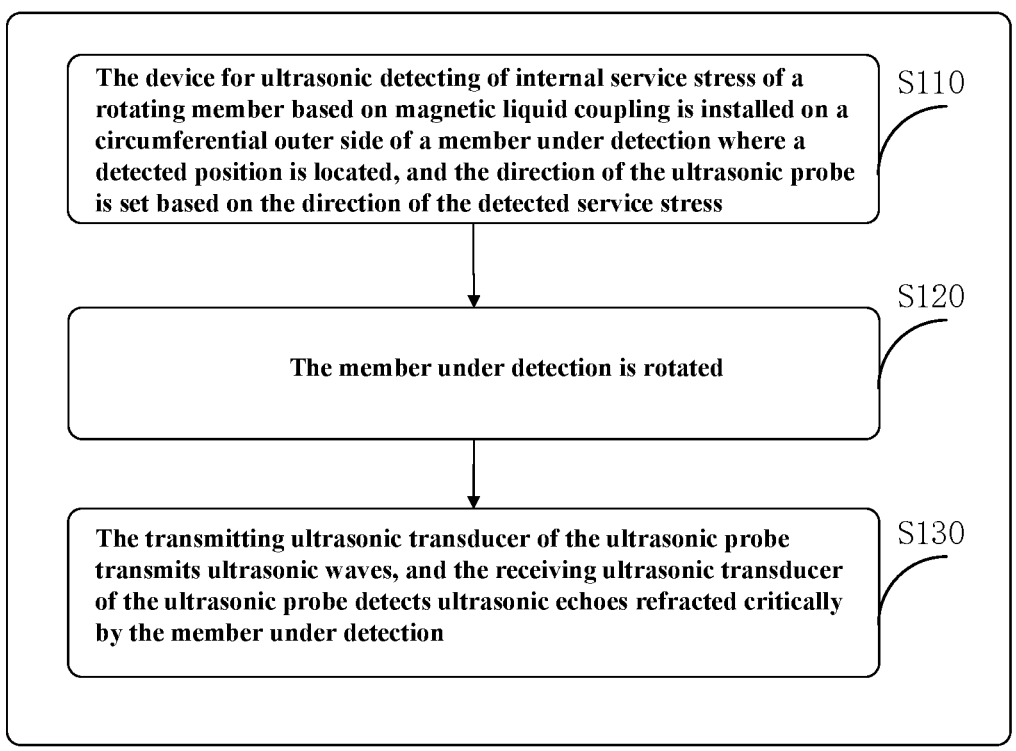
FIG. 3 is a flow chart of a method for ultrasonic detecting a rotating member based on magnetic fluid coupling according to an embodiment of the present disclosure.

An embodiment of the present disclosure further provides a method for ultrasonic detecting the rotating member based on magnetic fluid coupling, which is shown in FIG. 3 and may include steps S110 to S130.

At the step S110, the device for ultrasonic detecting the rotating member based on magnetic fluid coupling is installed on a circumferential outer side of the member 40 under detection where a detected position is located.

Figure 2:
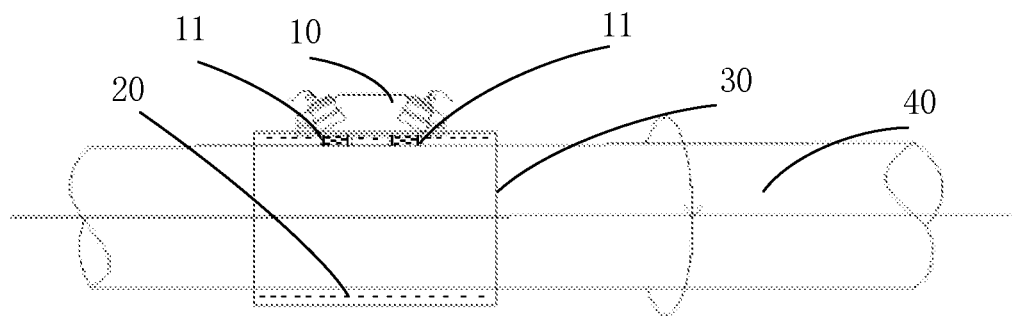
FIG. 2 is a schematic view of a device for ultrasonic detecting a rotating member based on magnetic fluid coupling according to an embodiment of the present disclosure, which is used for detecting axial service stress of the rotating member.

As shown in FIG. 1, if the circumferential service stress of the detected position is detected, the direction of the ultrasonic probe 10 is the circumferential direction of the member 40 under detection. As shown in FIG. 2, if the axial service stress of the detected position is detected, the direction of the ultrasonic probe 10 is the axial direction of the member 40 under detection. The direction of the ultrasonic probe 10 may be controlled to detect stresses in different directions.

Because of the magnetic fluid coupling, the member 40 under detection according to the present disclosure is made of a non-ferromagnetic material or a ferromagnetic material with good demagnetization effect.

At the step S120, the member 40 under detection is rotated.

At the step S130, the transmitting ultrasonic transducer of the ultrasonic probe 10 transmits ultrasonic waves, and the receiving ultrasonic transducer of the ultrasonic probe 10 detects ultrasonic echoes refracted critically by the rotating member 40 under detection, so as to calculate the internal service stress of the rotating member 40 under detection.

Calculating of the internal service stress of the rotating member 40 under detection based on the ultrasonic echoes is carried out by a peripheral apparatus, which does not belong to the content of the present disclosure and is not described herein.

The above description is only for the purpose of illustrating the preferred embodiments of the present disclosure and is not intended to limit the present disclosure, and any modifications, equivalents, improvements and the like made within the spirit and the principle of the present disclosure should be included in the scope of protection of the present disclosure.

What is claimed is:

1. A device for ultrasonic detecting a rotating member based on magnetic fluid coupling, comprising: an ultrasonic probe, magnetic field protection rings, a magnetic fluid and a magnetic fluid protection cover;

the ultrasonic probe is arranged above the rotating member under detection which is horizontally placed;

the magnetic fluid protective cover is sleeved on a circumferential outer side of the rotating member under detection where a detected position is located, and front ends of a transmitting ultrasonic transducer and a receiving ultrasonic transducer of the ultrasonic probe are arranged to penetrate through the magnetic fluid protective cover, a cavity formed between the magnetic fluid protective cover and the rotating member under detection is filled with the magnetic fluid, and the magnetic fluid is a liquid mixture solution, which at least includes oily or aqueous liquid and suspended ferromagnetic particles; and the front ends of the transmitting ultrasonic transducer and the receiving ultrasonic transducer of the ultrasonic probe are provided with the magnetic field protection rings for generating magnetic fields in the magnetic field protection rings, and the generated magnetic fields attract and attach the magnetic fluid to the front ends of the transmitting and receiving ultrasonic transducers of the ultrasonic probe so as to achieve close contact of the magnetic fluid with the front ends of the transmitting and receiving ultrasonic transducers of the ultrasonic probe.

2. The device according to claim 1, wherein the magnetic field protection rings are made of permanent magnet materials.

3. The device according to claim 1, wherein the magnetic field protection rings have a distance greater than 0.05 mm from a surface of the rotating member under detection.

4. The device according to claim 1, wherein a direction of the arranged ultrasonic probe is a circumferential direction or an axial direction of the rotating member under detection, wherein the direction of the ultrasonic probe is a direction of a connection line from a center position of the transmitting ultrasonic transducer to a center position of the receiving ultrasonic transducer.

5. The device according to claim 1, wherein the two ultrasonic transducers of the ultrasonic probe are each provided, at the front ends, with an acoustic impedance matching layer which matches acoustic impedance of the magnetic fluid.

6. The device according to claim 1, wherein parts of two ends of the magnetic fluid protection cover that are in contact with a circumferential surface of the rotating member under detection are sealed by a soft material.

7. A method for ultrasonic detecting a rotating member based on magnetic fluid coupling using a device including an ultrasonic probe, magnetic field protection rings, a magnetic fluid and a magnetic fluid protection cover, wherein the ultrasonic probe includes a transmitting ultrasonic transducer and a receiving ultrasonic transducer having front ends that include the magnetic field protection rings for generating magnetic fields in the magnetic field protection rings, and wherein the generated magnetic fields attract and attach the magnetic fluid to the front ends of the transmitting and receiving ultrasonic transducers so as to achieve close contact of the magnetic fluid with the front ends of the transmitting and receiving ultrasonic transducers, said method comprising the steps of:

installing the device for ultrasonic detecting the rotating member based on magnetic fluid coupling on a circumferential outer side of the rotating member under detection where a detected position is located;

rotating the rotating member; and transmitting ultrasonic waves by the transmitting ultrasonic transducer of the ultrasonic probe in the device, and detecting, by the receiving ultrasonic transducer of the ultrasonic probe, ultrasonic echoes refracted critically by the rotating member under detection so as to calculate internal service stress of the rotating member.

* * * * *